United States Patent [19]

Neubauer

[11] Patent Number: 5,196,659

[45] Date of Patent: Mar. 23, 1993

[54] TURN SIGNAL SWITCH WITH CAM OPERATED SNAP ACTION SWITCHES

[75] Inventor: Walter Neubauer, Lauffen, Fed. Rep. of Germany

[73] Assignee: SWF Auto-Electric GmbH, Fed. Rep. of Germany

[21] Appl. No.: 743,430

[22] PCT Filed: Dec. 14, 1990

[86] PCT No.: PCT/EP90/02185

§ 371 Date: Aug. 21, 1991

§ 102(e) Date: Aug. 21, 1991

[87] PCT Pub. No.: WO91/09752

PCT Pub. Date: Jul. 11, 1991

[30] Foreign Application Priority Data

Dec. 23, 1989 [DE] Fed. Rep. of Germany ....... 3942925

[51] Int. Cl.$^5$ .................... H01H 25/04; H01H 3/42; H01H 5/04; B60Q 1/38

[52] U.S. Cl. .................... 200/61.27; 200/6 B

[58] Field of Search ............ 200/61.27-61.38, 200/61.54, 412, 427, 431, 434, 449, 416, 417, 6 B

[56] References Cited

U.S. PATENT DOCUMENTS

| | | | |
|---|---|---|---|
| 3,209,092 | 9/1965 | Vitaloni et al. | 200/61.34 |
| 3,892,932 | 7/1975 | Erdelitsch et al. | 200/61.27 |
| 4,336,428 | 6/1982 | Berginski | 200/61.54 |

FOREIGN PATENT DOCUMENTS

| | | |
|---|---|---|
| 3336877 | 5/1985 | Fed. Rep. of Germany . |
| 3336878 | 5/1985 | Fed. Rep. of Germany . |
| 3402082 | 7/1985 | Fed. Rep. of Germany . |

Primary Examiner—J. R. Scott
Attorney, Agent, or Firm—Robert P. Seitter; J. Gordon Lewis

[57] ABSTRACT

This invention is an electric switch, in particular, a turn-signal switch for motor vehicles for indicating a change of direction of a lane change. In this switch, a carrier mounted in a housing is movable out of a central position into opposite directions preferably by a switch lever which is swivellable about an axis of rotation fixed on the housing. A switch of this kind must be compact and equipped with so-called click elements as movable contacts. This is achieved in that a first snap contact bar is swivellably mounted on an outer end closely to one side wall of the switch housing and has a catch on its inner end. A touch slide acts upon the snap contact bar wherein, after a swivelling motion of the carrier out of the central position, a first stationary contact may be acted upon by the snap contact bar and wherein a second contact bar, a second touch slide and a second stationary contact are arranged symmetrically to the first snap contact bar, the first touch slide and the first stationary contact relative to the central position of the carrier.

32 Claims, 9 Drawing Sheets

TURN SIGNAL SWITCH WITH CAM OPERATED SNAP ACTION SWITCHES

BACKGROUND OF THE INVENTION

1 Field of the Invention

This invention relates to an electric switch in particular used as a turn-signal switch for motor vehicles for indicating a change of direction or a lane change and having a carrier mounted in a switch housing, which carrier is preferably movable from a central position to opposite directions and especially swivellable about an axis of rotation fixed to the housing.

2. Description of the Relevant Art

An electric switch of this kind is for example known from the German laid open publication 3 626 241. In this switch, a middle stationary contact and two lateral ones as well as a movable bridging contact are accommodated in a switch housing, which bridging contact, in its center, is tiltably mounted on the middle stationary contact. In the central position of the carrier, the bridging contact is tilted about an edge of the middle stationary contact and bumps on a lateral stationary contact. The middle stationary contact is then connected in an electrically conductive manner with the lateral stationary contact, so that, e.g. the left-hand turn-signal lamps emit a signal, when the switch is used as a turn-signal switch. It is true that the bridging contact of this electric switch can be changed over rapidly, however, the switching speed can be negatively influenced by slowly moving the switch lever.

From the German laid open publication 3 626 241 as well as from the German patent 3 336 877 a so-called click-action switching device is also known in which the switching speed of the movable contact cannot be influenced via the operating device. A click-action switching device comprises a snap contact bar which is swivellably mounted on one end and bears a catch on the other end. Another catch, movable by a contact piece, rests against the catch of the snap contact bar. In the longitudinal direction of the snap contact bar at least one of the catches is displaceable against a spring and at least one of the catches has a wedge profile which faces the other catch. When the contact piece is operated, one catch glides along a side of the wedge profile of the other catch, whereby the spring acting upon one catch is increasingly tensioned. When the tip of the wedge profile has been passed, the first catch glides along on the other side of the wedge profile, whereby the spring is released and changes over the snap contact bar abruptly. Because it is not possible to hold one catch at the tip of the wedge profile of the other catch, the changeover speed of the snap contact bar cannot be affected by the moving speed of the contact piece.

SUMMARY OF THE INVENTION

It is an object of the invention to develop an electric switch in such a way that a high number of operations can be achieved and that by a compact construction a small overall size of the switch housing is made possible.

This problem is solved according to the invention in that an electric switch includes a first snap contact bar, a first touch slide and a first stationary contact symmetrically arranged with respect to a second snap contact bar, a second touch slide and a second stationary contact.

Thus, in an electric switch according to the invention one of two snap contact bars or click devices is actuated, when the carrier is moved out of its central position or back into its central position, whereas the other click device remains at rest. A high number of operations can be achieved by click devices of this kind. In the sense of a compact construction a touch slide is used for each click device. Each snap contact bar is swivellably mounted closely to a lateral wall of the switch housing. The two touch slides in front of the inner ends of the two snap contact bars are positioned one beside the other, if looked at in their moving direction. The two click devices are altogether symmetrically arranged relative to the central position of the carrier.

Advantageous embodiments of an electric switch according to the invention can be seen from the subclaims.

According to one embodiment each one of the two snap contact bars is connected in an electrically conductive way with another stationary contact. This connection is advantageously effected in that a snap contact bar is by its outer end mounted in the manner of a knife-edge bearing on its associated other stationary contact.

In order to keep the wear on the carrier and on the touch slides at a low level, the carriers and the touch slide have co-operating gliding slopes. A gliding slope only on the carrier or only on the touch slides seems to be less favorable.

In principle a design is possible in which the two springs acting upon the touch slide are released in the central position of the carrier. A touch slide is thus pressed against the force of the spring acting upon it when the carrier is moved out of its central position. In a design of this kind for each touch slide, a cam running against it can be provided, which cam is always positioned laterally of the touch slide and acts upon the touch slide when the carrier is moved toward the center. Then the carrier is of a relatively big size, so that the switch is altogether big. However a single cam can also be provided which is positioned between the two touch slides. In this case the two touch slides cannot be brought as close to each other as desired, because the cam due to the desired switching angle must not fall short of a given size.

Therefore an embodiment is particularly preferred in which, in the central position of the carrier each touch slide is pressed down against the force of the spring acting upon it and, when the carrier is moved out of the central position, only one touch slide is removed from the carrier and the first and second stationary contacts are positioned on the side of the respective snap contact bar not facing the carrier.

In order to provide that, perpendicularly to the moving direction of the carrier, the switch can be made small so that the inner ends of the two snap contact bars are to face each other and the two touch slides are to be positioned between the two snap contact bars.

In motor vehicles with hazard warning switches, electric wirings are used requiring that the turn-signal switch has also closed contacts in the central position of the carrier. For a use together with a hazard warning switch therefore a third and a fourth stationary contact are arranged opposite to the first and the second stationary contact relative to the respective snap contact bar and acted upon by the respective snap contact bar in the central position of the carrier.

In particular in the U.S.A., the stop lamps are also used as turn-signal lamps for indicating direction or lane change. Then the vehicle has to be equipped with, a so-called dual-circuit turn-signal switch. In a switch of another embodiment a third and a fourth snap contact bar and a third and a fourth touch slide are advantageously provided and arranged in the same relative position towards each other and to the central position of the carrier as the first and the second snap contact bar and the first and the second touch slide, whereby the four touch slides are positioned on beside the other in the corners of a rectangle. Advantageously the two touch slides on one side of the carrier are at least substantially simultaneously displaceable upon actuation of the carrier, so that the snap contact bars attributed to the lamps on one side of a motor vehicle are simultaneously operated.

In order to reduce the number of various piece parts for different types of an electric switch according to the invention it is necessary that, if only two snap contact bars are needed, nevertheless the same switch housing or the same switch housing part is used which then comprises vacancies or recesses for arranging a third and a fourth snap contact bar and a third and a fourth touch slide in accordance with the first and second snap contact bars and the first and second touch slides. In the preferred embodiment the first and second contact bars and the first and second touch slides are farther away from the axis of rotation of the carrier than the respective vacancies.

BRIEF DESCRIPTION OF THE DRAWINGS

Several embodiments of an electric switch according to the invention are shown in the drawings. These embodiments are developed as turn-signal switches. The invention will now be described in detail by way of the Figures of the drawings, in which.

DESCRIPTION OF THE PREFERRED EMBODIMENTS

Figure 1:
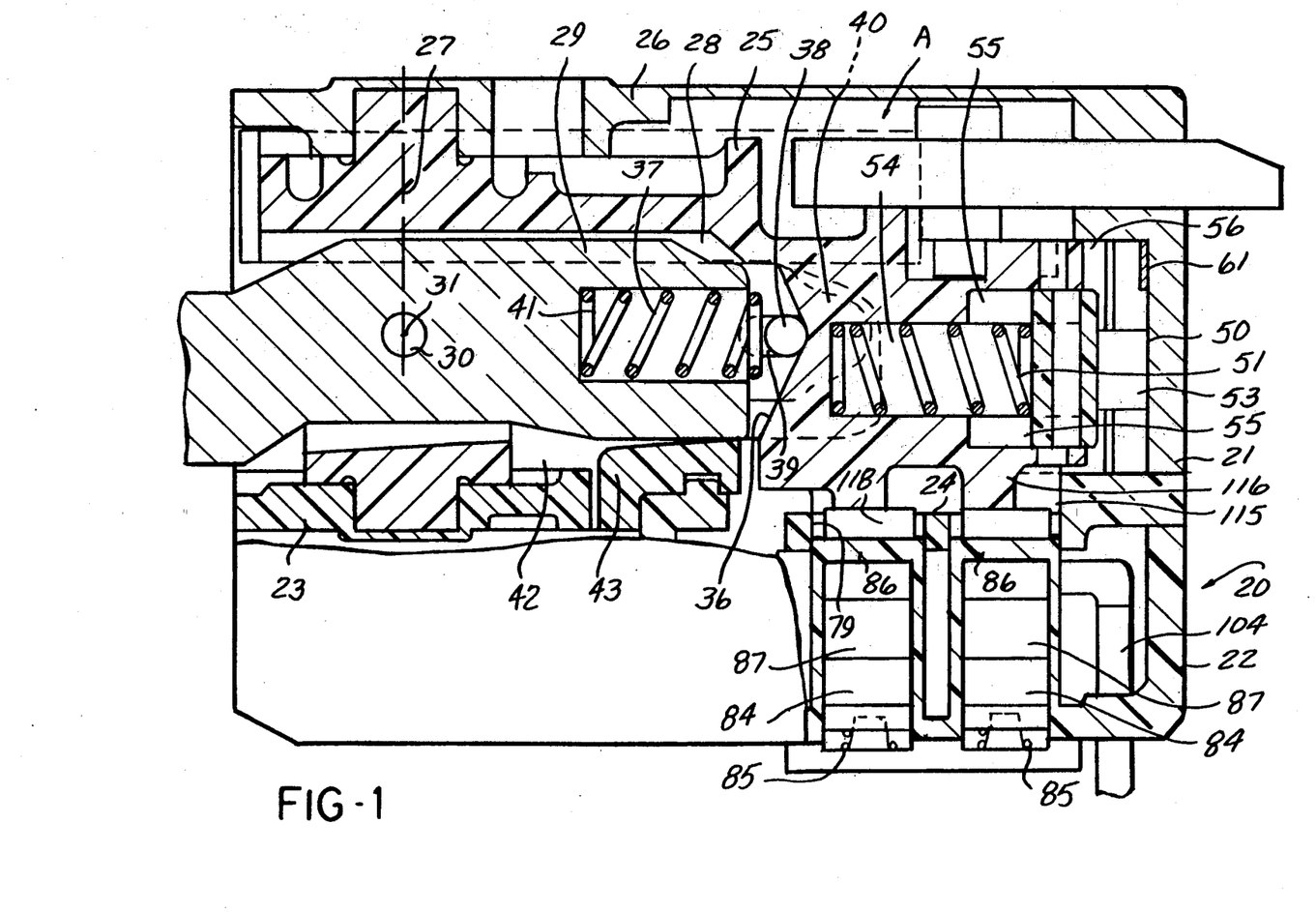
FIG. 1 is a longitudinal section of a first embodiment through the axis of rotation of the carrier.

The electric switch shown in FIG. 1 is a steering column switch in which, in a housing 20 comprising a box-shaped top 21 of zinc diecasting and a plastic base plate 22 as well as a first intermediate plate 23 and a second intermediate plate 24, a carrier 25 is mounted in the covering 26 of the top 21 and in the intermediate plate 23, so that it can be swivelled about an axis 27 in a plane generally designated horizontal. A switch lever 29 projects into a hollow space 28 of the carrier 25, which switch lever, in a plane generally designated vertical, is swivellably mounted on the carrier 25 via a pin whose axis 31 extends perpendicularly through the axis 27. A wall of the carrier 25 facing the hollow space 28 is formed as V-shaped switching cam 36 against which a locking roll 38 is pressed by a helical compression spring 37, which locking roll is linearly guided in two oblong holes 39 positioned in two ears 40 of the switch lever 40 laterally passing the switching cam 36. The helical compression spring 37 is inserted in a pocket hole 41 of the switch lever 29.

In the zero position of the switch lever 29 shown in FIG. 1, which is stable with regard to the carrier 25, the locking roll 38 is positioned at the tip of the switching cam 36. In addition the switch lever 29 rests against the carrier 25 towards the ceiling of the housing top 21. Therefore, looked at according to FIG. 1, the switch lever can only be swivelled about the axis 31 in clockwise direction, whereby the switch lever actuates a slide 43 resting against itself through an aperture 42 of the carrier 25. If the switch lever 29 is swivelled about the axis 27, it also turns the carrier 25. Starting from a stable central position there are provided a self-releasing intermediate position marked by an action point and a stable operating position for the switch lever 29 and the carrier 25 in the horizontal swivelling plane towards both sides. This switching behavior is obtained by a locking system comprising a locking roll 50, a helical compression spring 51 and two locking levers 53 rotatably mounted in the housing 20 and each equipped with a locking cam. The helical compression spring 51 is received by a pocket hole 54 of the carrier 25 and, on the one hand, it is supported on the bottom of this pocket hole and, on the other hand, on the locking roll 50. The locking roll 50 is guided in such a way in two longitudinal recesses 55 of the carrier positioned opposite each other with regard to the axis of the pocket hole 54 and open towards the locking levers 53, so that it can linearly move relative to the carrier in the direction of the force of the helical compression spring 51, but that it is firmly held on the carrier in the switching direction.

Each locking lever 53 is mounted on a pin 56 of which one end is inserted with a press-fit into a bore of the housing 21 not shown in the drawing. The two locking cams 52 meet in the middle between the two axes of rotation of the locking levers 53 and form a locking trough, into which, in the central position of the carrier, the locking roll 50 is pressed by the helical compression spring 51. The two locking levers 53 thereby rest against the housing top 21. Thus a stable central position of the carrier 25 and of the switch lever 29 is ensured. From the locking trough each locking cam 52 rises towards the outside and ends in a portion 60 which is so steep that it is effectively an insurmountable stop for the locking roll. The stop 60 is positioned in such a way that the locking roll 50 is still a little bit away from the dead center, when it abuts the stop, in which dead center it would also swivel the locking levers 53 without a stop. If the carrier 25 is moved out of the central position and the locking roll 50 thus moves along on one of the two locking cams 52, it can be noticed from a clearly increasing amount of force necessary for continuously swivelling the carrier 25 that an intermediate position is reached, in which the locking roll 50 has hit the portion 60 of a locking cam 52. If the switch lever 29 is let go in this intermediate position, it and the carrier 25 as well automatically returns into the central position.

If, however, the carrier 25 is moved beyond the intermediate position, the corresponding locking lever 53 is swivelled. Until the dead center of the swivelling action is reached, a big force from outside is necessary hereto. Thereafter a swivelling can be effected solely by means of the spring 51. At the end of the movement the locking lever 53 rests against the housing top 21 in a different place. The portion 60 of each locking cam 52 serving as a stop is so steep that, when the corresponding locking lever has been swivelled, it is effective as a locking trough for the locking roll. The carrier 25 and the switch lever 29 thus again occupy a stable operating position. In order to provide that each locking lever 53 retains its position even if it is not acted upon by the locking roll 50, a leaf spring 61 extending between the locking levers 53 and the housing top 21 from one locking lever to the other rests against a flattening 62 of each of the two locking levers 53. A swivelling of the locking lever results in a greater tension of the leaf spring 61, so that the latter tends to retain the locking levers in the positions shown in FIG. 2.

By swivelling the carrier 25 in a certain direction out of the central position or back into, it always actuates two of four movable contacts 65, 66, 67 and 68 which are inserted in the base plate 22. Each movable contact is formed as a longitudinal snap contact bar which with an outer end 69 is directly swivellably mounted on a side wall 70 or 71 of the base plate 22 on a stationary contact 72, 73, 76 or 77. For this purpose the snap contact bar projects with a narrow elongation 74 through an aperture 75 of the stationary contact. The outward ends of the snap contact bars 65 and 67 are positioned at the side wall 70 and the outward ends of the snap contact bars 66 and 68 are positioned on the opposite side wall 71 of the base plate 22. In addition the snap contact bars 65 and 66 on the one hand and the snap contact bars 66 and 68 on the other hand are symmetrically arranged relative to a central position of the carrier 25, in which the carrier 25 is located symmetrically at both sides of the central plane E shown in FIG. 3. All snap contact bars are mounted in such a way that they can be swivelled in a plane standing vertically on the base plate and vertically on the plane E.

Figure 4:
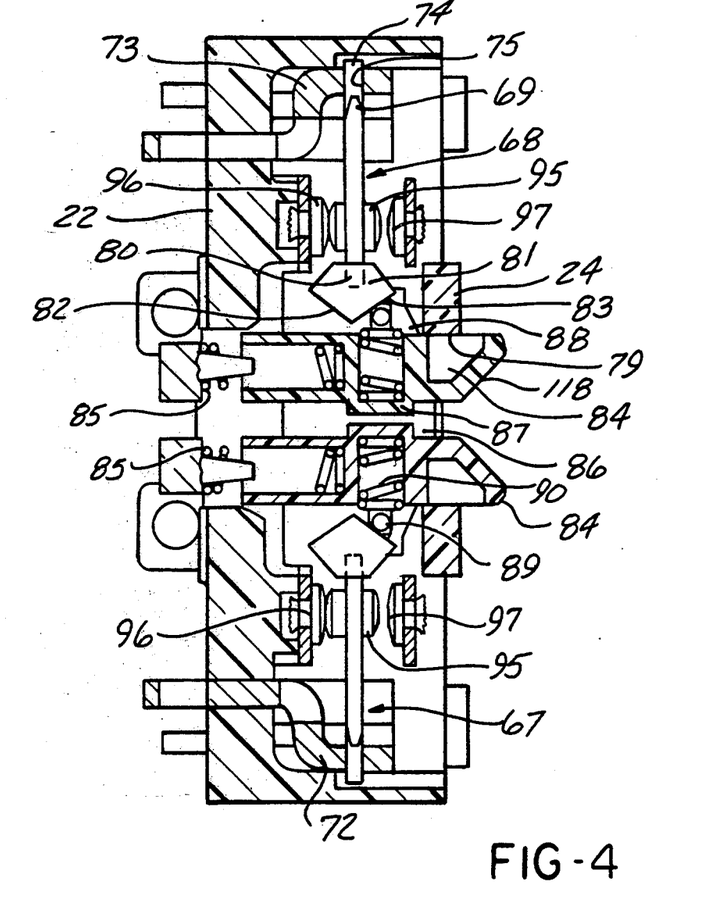
FIG. 4 is a cross section taken on the line 4—4 of FIG. 3 or FIG. 8.

At an inner end 80 each snap contact bar 65, 66, 67 or 68 carries a catch 81 having a wedge profile with two sides 82 and 83 whose tip is pointing to the catch opposite to it relative to the plane E. In front of the inner end of each snap contact bar a touch slide 84 is guided in the base plate 22 in such a way that it can be linearly moved in direction of the axis 27 of the carrier 25. Each touch slide 84 is upwardly pressed towards the carrier 25 by a helical compression spring 85 supported on the base plate 22 and on the respective touch slide 84. However the upward movement is limited by a web 86 of the base plate, which can be hit by a shoulder 87 of a touch slide 84. Each slide is additionally guided by the intermediate plate 24 in which openings 79 are provided through which the touch slides 84 can approach the carrier 25. As FIG. 4 shows, in particular each touch slide 84 is guided by the intermediate plate 24 at the side opposite to the shoulder, so that the shoulder 87 cannot avoid the web 86, but on the other hand the touch slide 84 can be easily inserted into the base plate 22 before fitting the intermediate plate 24. In two lugs 88 of each touch slide 84 laterally encompassing the catch 81 of a snap contact bar, a locking roll 89 is guided in such a way that it is movable transversely to the moving direction of the touch slide 84 and in the longitudinal direction of a snap contact bar. The locking roll 89 is pressed against a side of the catch 81 on the associated snap contact bar 65-68 by a helical compression spring 90 braced between a touch slide, 84 and a locking roll 89.

Figure 3:
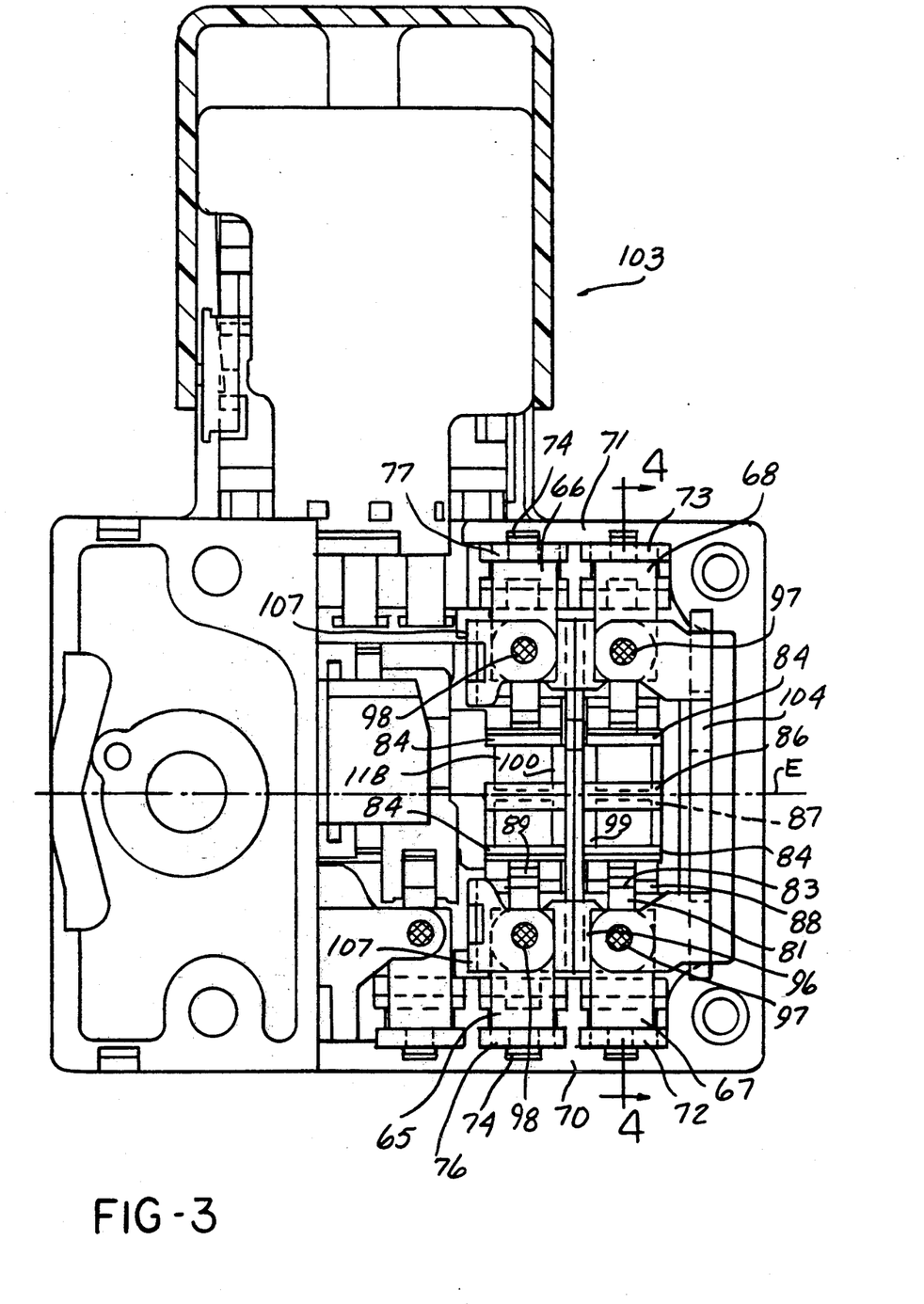
FIG. 3 is a top view of the equipped base plate of the embodiment according to FIG. 1.

The above-described arrangement between a touch slide 84 and one of the contact bars is the same for all snap contact bars 65, 66, 67 and 68 and the associated touch slides 84 are arranged in the same way as the snap contact bars 65 and 66 and the associated touch slide 84. The snap contact bars 67 and 68 are only farther away from the axis of rotation 27 of the carrier 25 than the snap contact bars 65 and 66. In particular FIG. 3 shows that the four touch slides are accommodated adjacent to each other in the four corners of a rectangle.

Between its bearing and its catch 81 a double contact rivet 95 is fixed on the snap contact bar, which contact rivet, in one operating position of the snap contact bar 67, acts upon a stationary contact 96 which, on one side of the snap contact bar 67, is close to the bottom of the base plate 22 and, in the other operating position of the snap contact bar 67, acts upon a stationary contact 97. Likewise, a stationary contact 96 and a stationary contact 97 are available for the snap contact bar 68. To the two snap contact bars 65 and 66 are assigned in the same way a stationary contact 96 and a stationary contact 98 each of whose position relative to the respective snap contact bar 65 or 66 corresponds to a position of a stationary contact 97 relative to a snap contact bar 67 or 68.

All stationary contacts 96, 97 and 98 are fixed on sheet metal strips penetrating the base plate towards the outside. The two stationary contacts 96 for the snap contact bars 67 and 68 are positioned on a sheet metal strip 99 and the two stationary contacts for the snap contact bars 65 and 66 on a contact metal strip 100, which together with the contact metal strip 99 and in an electrically conductive contact with it is guided through the base plate 22. At the back of the base plate 22 the two sheet metal strips 99 and 100 are connected with a stationary contact 102 of a hazard warning switch 103 via a cable 101, which hazard warning switch is connected with the turn-signal switch in the present example. The two stationary contacts 97 are positioned on a sheet metal strip 104, which at the back of the base plate 22 is connected with a stationary contact 106 of the hazard warning switch 103 via a cable 105. Eventually the two stationary contacts 98 are positioned on sheet metal strips 107 which at the back of the base plate 22 are connected in an electrically conductive manner with each other and with a stationary contact 108 of the hazard warning switch 103 via an additional sheet metal strip 109.

Figure 5:
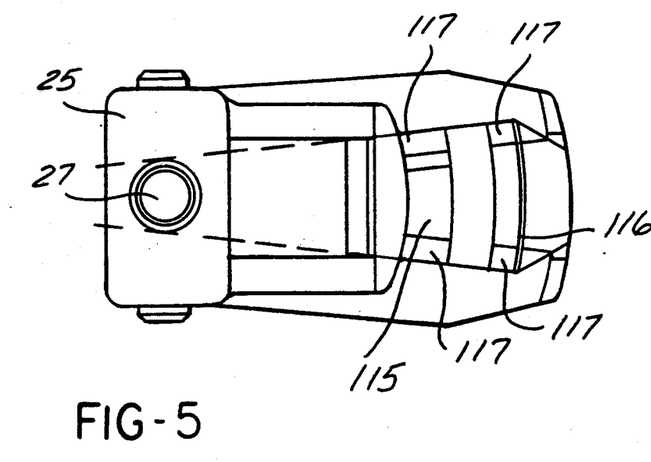
FIG. 5 is a view on the side of the carrier which faces the base plate.

At its underside facing the base plate 22 the carrier 25 has two protruding cams 115 and 116 which in the swivelling direction of the carrier 25 are sufficiently so long, that in the central position of the carrier 25 the cam 115 presses down touch slides 84 assigned to the two snap contact bars 65 and 66 and the cam 116 the touch slides 84 assigned to the two snap contact bars 67 and 68 against the force of the springs 85. In the central position of the carrier 25 the double contact rivets 95 act upon the stationary contacts 97 and 98 positioned above the snap contact bars. The cams 115 and 116 are provided with sliding slopes 117 co-operating with sliding slopes 118 on the touch slides 84. Of course the deepening between the two cams 115 and 116 especially to be seen from FIG. 1 is not absolutely necessary, so that the two cams would be regarded as a single cam. The two cams are curved in the manner of an arc, so that, when the carrier 25 is swivelled, their position relative to the touch slides 84 vertically to the swivelling direction remains unchanged. As can be clearly seen from FIG. 5 the lengthening of a connecting line between the two ends of the two cams 115 positioned on the same side passes the axis of rotation of the carrier 25 with a spacing. Thus, the cams do not end on a radial. By selecting the spacing appropriately it is achieved that the two touch slides 84 of the two snap contacts bars 65 and 67 or 66 and 68 and thus also the snap contact bars are at least substantially simultaneously moved, when the carrier 25 is swivelled.

Figure 6:
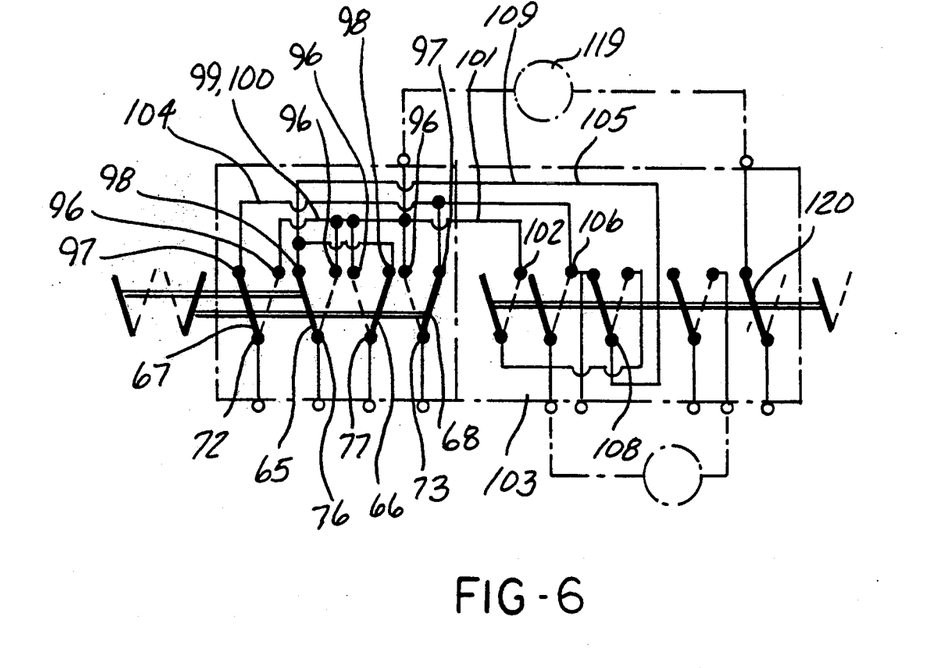
FIG. 6 is a circuit diagram for an internal wiring of the first embodiment in which a dual-circuit turn-signal switch is combined with a hazard warning switch.

By way of the systematic representation according to FIG. 6 one can get an idea which stationary contact and outer terminals are interconnected in the various positions of the carrier 25. The positions of the snap contact bars 65 to 68 in the central position of the carrier 25 are shown by continuous lines. It can be recognized that the snap contact bars 67 and 68 connect the stationary contacts 72 and 73 via the stationary contacts 97, the sheet metal strip 104 and the cable 105 with the stationary contacts 98 and the sheet metal strip 109 with the stationary contact 108 of the hazard warning switch.

Figure 2:
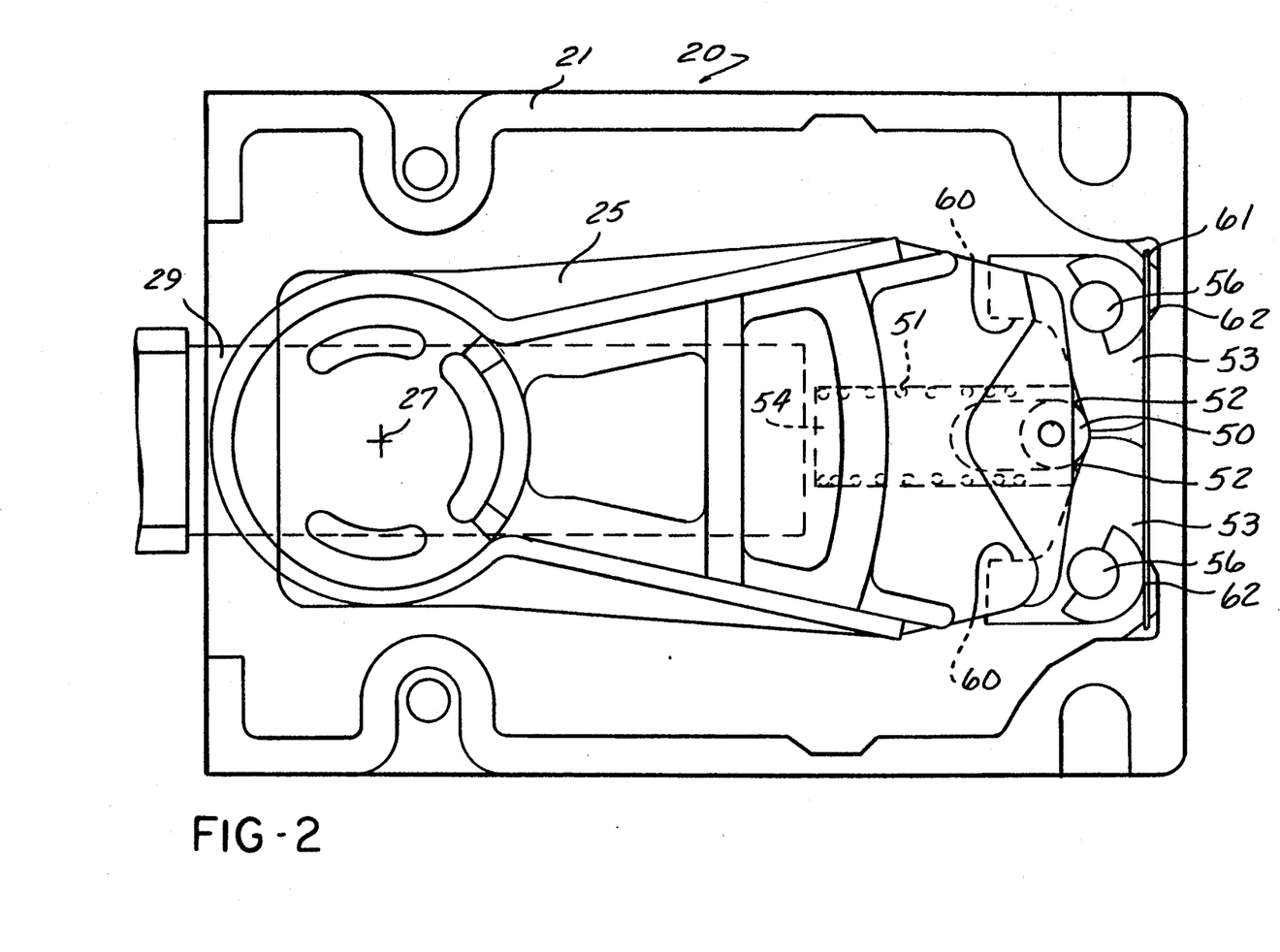
FIG. 2 is a top view on the embodiment of FIG. 1 in the direction of arrow A.

If, in view according to FIG. 2, the carrier 25 is moved out of its central position in a clockwise direction, the touch slides 84 of the two snap contact bars 66 and 68 are released by the cams 115 and 116 and, due to the pressure spring 85, move upwardly until the shoulder 87 rests against the web 86. During this movement the snap contact bars 66 and 68 are abruptly changed over and now rest against the stationary contacts 96 by means of their contact rivets 95. If the turn-signal switch is connected to the motor vehicle electrical system, the turn-signal lamps on the right-hand side of the vehicle light up due to the fact that the stationary contacts 96 are connected with the positive pole of a voltage source via a flasher and an ignition switch not shown in detail in the drawing. If the carrier 25 is swivelled into the opposite direction, the snap contact bars 65 and 67 act upon the stationary contacts 96 and the turn-signal lamps at the left-hand side of the motor vehicle are lit up.

Figure 7:
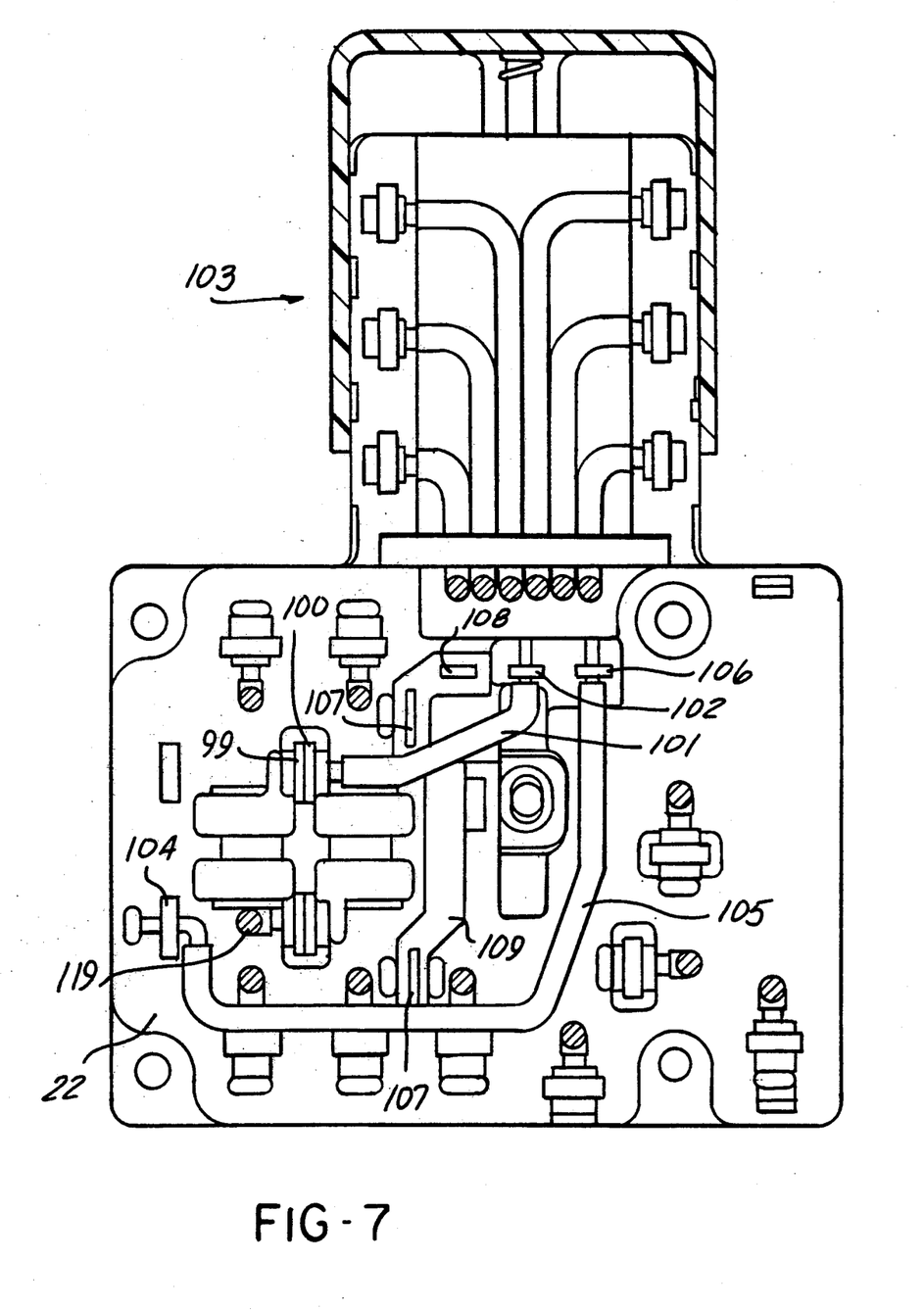
FIG. 7 is a view of the bottom of the base plate from which internal connections of the first embodiment can be seen.
Figure 8:
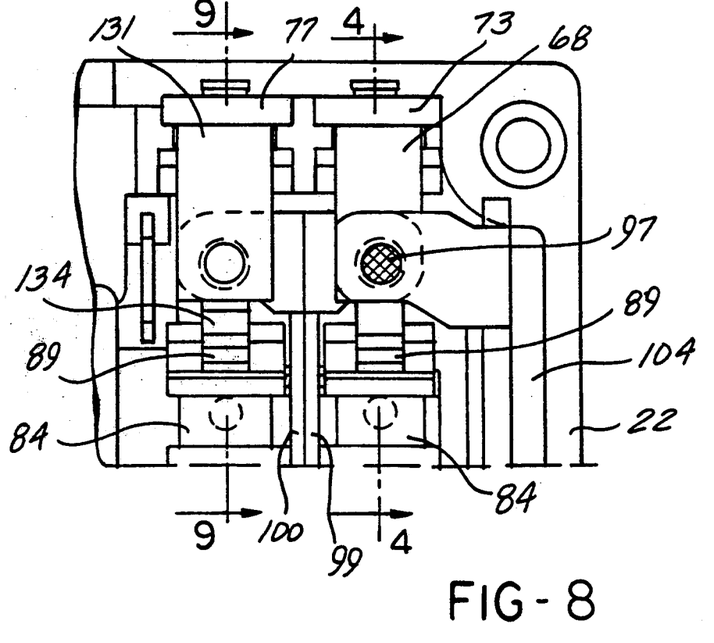
FIG. 8 is a partial view of the base plate of a second embodiment which is developed as a dual-circuit turn-signal switch without a hazard warning switch.
Figure 10:
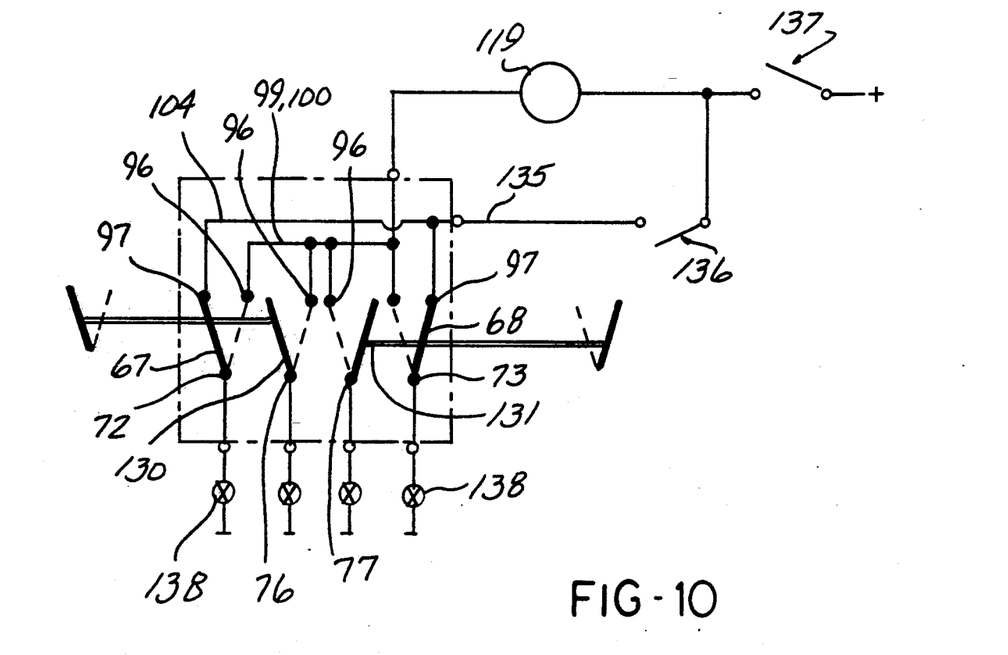
FIG. 10 is a circuit diagram of the second embodiment.

In the embodiment according to FIGS. 8 and 10 a dual-circuit turn-signal switch is not combined with a hazard warning switch. However the construction corresponds to a far-reaching extent to that according to FIGS. 1 and 7. Again four snap contact bars and four touch slides 84 are available, of which one each co-operates with a snap contact bar. The snap contact bars 67 and 68 are identically taken over from the embodiment according to FIGS. 1 to 7 and are positioned in the same places on the base plate 22. In the central position of the carrier 25, just as in the embodiment according to FIGS. 1 to 7, they act upon an upper stationary contact 97 by means of the double contact rivet 95, which stationary contact is fitted on the metal strip 104 and, in a lateral position of the carrier 25, acts upon a lower stationary contact 96 fitted on the sheet metal strip 99. The section taken on the line 4—4 according to FIG. 8 thus corresponds completely to the section taken on the line 4—4 of FIG. 3, so that with regard to more details reference can be made to FIG. 4.

Instead of the two snap contact bars 65 and 66 of the embodiment according to FIGS. 1 to 7 now two snap contact bars 130 and 131 are used, which in their shape and mounting principally correspond to the snap contact bars 65 to 68. However, the snap contact bars 130 and 131 only have a single contact rivet 132 by means of which they can act upon a stationary contact 96. An upper stationary contact 98 available in the embodiment according to FIGS. 1 to 7 is missing. Moreover the snap contact bars 130 and 131 also have a catch differently formed from that of the snap contact bars 65 to 68, which catch co-operates with the locking roll 89 guided and resiliently supported on the touch slide 84. This catch 133 is laterally provided with a projection 134, which in one end position of a snap contact bar 130 or 131 hits the intermediate plate.

Figure 9:
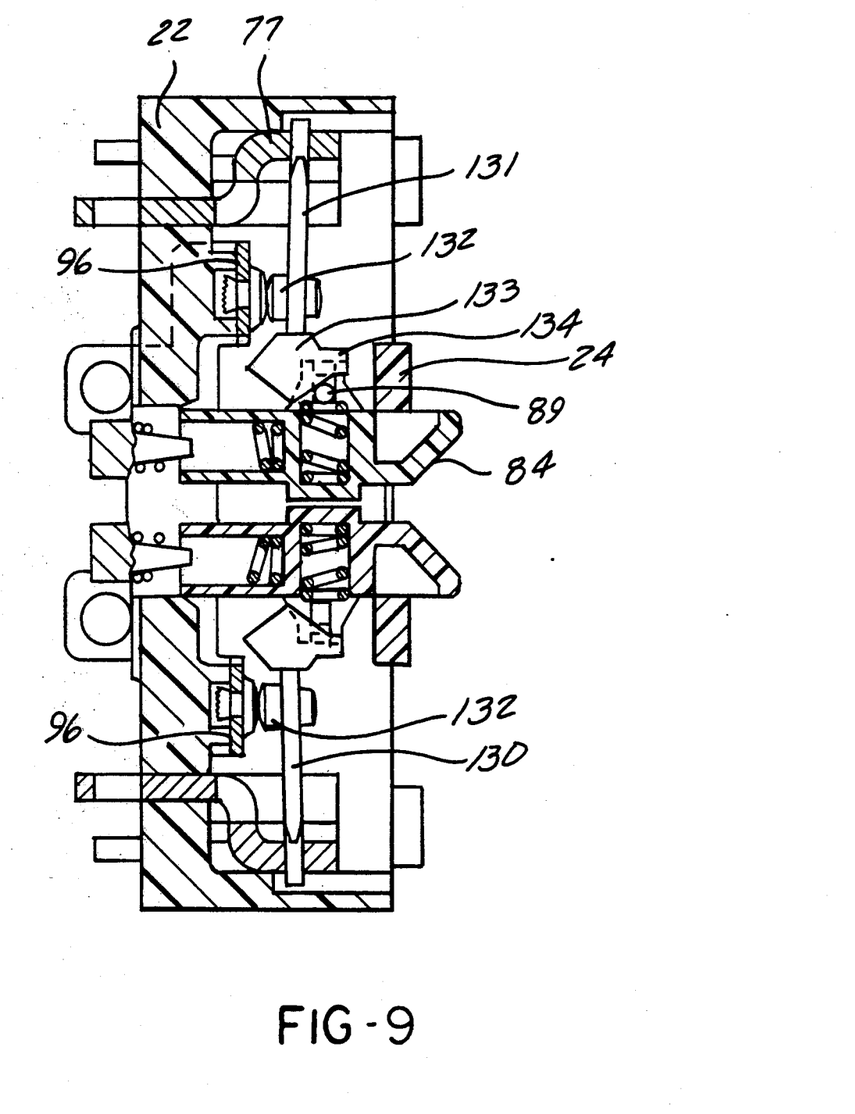
FIG. 9 is a cross section taken on the line 9—9 of FIG. 8 or FIG. 11.

FIG. 10 is the circuit diagram of the embodiment according to FIGS. 8 and 9 from which can be seen which electric contacts are closed or open in the various operating positions of the carrier 25. The snap contact bars 67, 68, 130 and 131 are shown by continuous lines in the positions they occupy when the carrier 25 is in its central position. The snap contact bars 130 and 132 do not touch a stationary contact. The snap contact bars 67 and 68 connect the stationary contacts 72 or 73 with the stationary contacts 97 connected to a brake switch 136 via the metal strip 104 and a cable 135. When the brake is actuated, the brake switch 136 is closed, so that, with a closed ignition switch 137 the rear signal lamps 138 of a motor vehicle are supplied with voltage and are illuminated. If the carrier 25, looked at according to FIG. 2, is swivelled in a clockwise direction the snap contact bars 68 and 131 each act upon a stationary contact 96 and connect the latter with a stationary contact 73 or 77. When the ignition switch 137 is closed, the signal-lamps on the right-hand side of the motor vehicle are supplied with voltage via the flasher 119 and are lighted in an intermittent way. When the carrier 25 is swivelled into the opposite direction the snap contact bars 67 and 130 are actuated, so that the signal lamps on the left-hand motor vehicle are illuminated.

Figure 11:
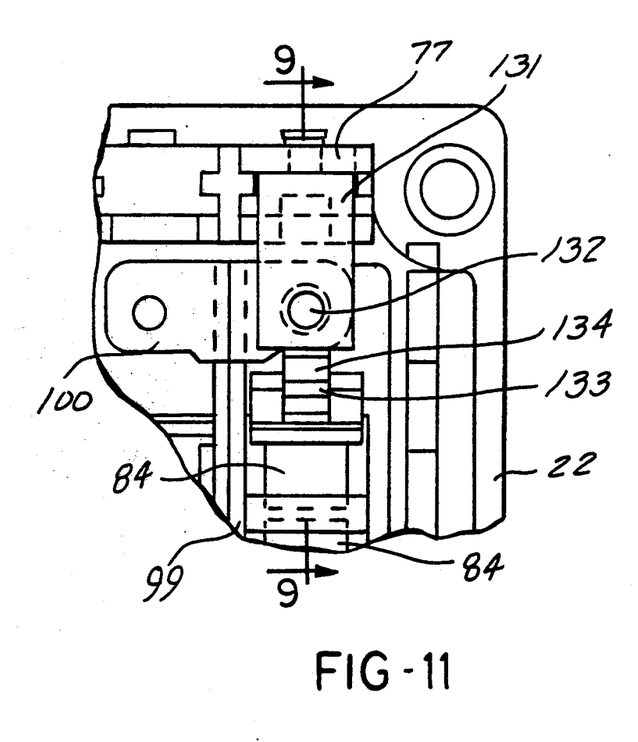
FIG. 11 is a top view of the base plate of a single-circuit turn-signal switch not combined with a hazard warning switch.
Figure 12:
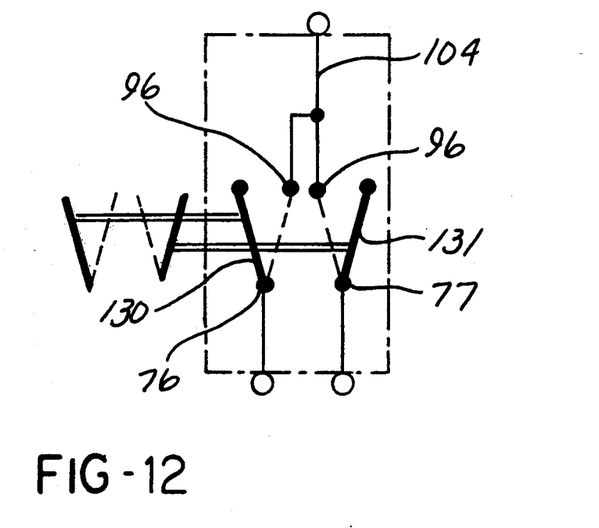
FIG. 12 is a circuit diagram of the embodiment according to FIG. 11.

FIG. 11 shows a sectional view of a single-circuit turn-signal switch, the circuit diagram of which can be seen from FIG. 12 and which is not combined with a hazard warning switch. In this turn-signal switch in the base plate 22 which is identical with the base plate of the two embodiments described above only two snap contact bars 130 and 131 are inserted which, just as in the embodiment according to FIGS. 8 and 9, have a single contact rivet 132 and a catch 133 with a projection 134. Only two touch slides 84 are also available. Closely above the bottom of the base pate 22 to each snap contact bar 130 and 131 a stationary contact 96 is assigned which is fitted on the sheet metal strip 99 and in one of the two swivelling positions of the carrier 25 is acted upon by the contact rivet 132 of the respective snap contact bar 130 or 131.

From FIG. 11 can be seen that the snap contact bar 131 and correspondingly the snap contact bar 130, the stationary contact 77, on which the snap contact bar 131 is swivellably mounted and correspondingly the stationary contact 76 and the two touch slides 84 are positioned in those recesses of the base plate 22 which are farther away from the axis 27 of the carrier 25 than the vacant recesses. Furthermore it can be recognized that also the sheet metal strip 100 is mounted, although without contact rivets, so that the sheet metal strip 99 has a firm seat in the base plate 22.

A section taken on the line 9—9 of FIG. 11 corresponds completely to the section of FIG. 9, so that more details can be pointed out by FIG. 9.

FIG. 12 shows the positions of the snap contact bars 130 and 131 in the central position of the carrier. It can be seen that in this position the stationary contacts 96 are not acted upon by the contact rivets 132. If the carrier 25 is swivelled out of the central position one of the snap contact bars 130 or 131 is changed over and connects the stationary contact 76 or 77 with a stationary contact 96. As in the embodiments according to FIGS. 6 and 10 the latter, after installation of the turn-signal switch in a motor vehicle, is connected with a turn-signal flasher via the sheet metal strip 99, so that, when the carrier 25 has been swivelled, the right-hand or left-hand turn-signal lamps of the motor vehicle are illuminated.

Figure 13:
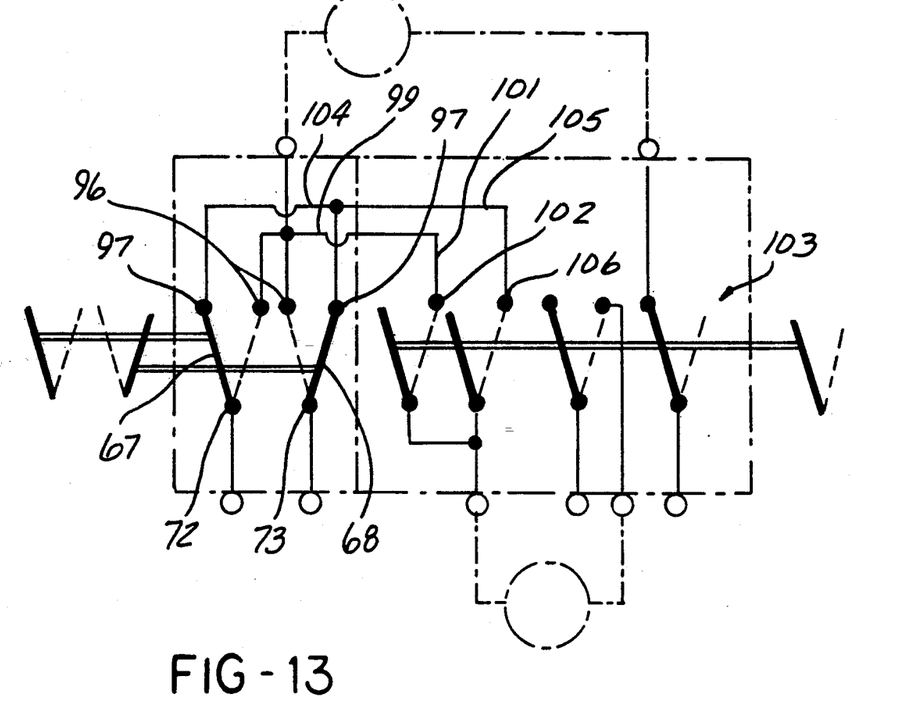
FIG. 13 is a circuit diagram of a fourth embodiment which is a single-circuit turn-signal switch combined with a hazard warning switch.

If a single-circuit turn-signal switch is combined with a hazard warning switch, two snap contact bars 67 and 68 are used instead of the snap contact bars 130 and 131 according to FIG. 11. Moreover a sheet metal strip 104 with two stationary contacts 97 is added just as in the embodiment according to FIGS. 1 or 7 or in the embodiment according to FIGS. 8 to 10. A section in the longitudinal direction of the snap contact bars is completely the same as the section according to FIG. 4, so that no additional graphic representation is necessary. From the circuit diagram according to FIG. 13 it can be seen that the stationary contacts 96 are again connected with a stationary contact 102 of the hazard warning switch via the sheet metal strip 104 and the cable 105.

In particular, as far as a single-circuit turn-signal switch with a hazard warning switch is concerned, it is of advantage that the snap contact bars 67 and 68, the stationary contacts 72 and 73 on which the snap contact bars are swivellably mounted and the two touch slides 84 are positioned in recesses of the base plate 22, which recesses are farther away from the swivelling axis 27 of the carrier 25 than the vacant recesses. Consequently the two stationary contacts 97 can now be easily interconnected via the sheet metal strip 104, whereas in an arrangement of the parts in the other recesses on grounds of space an additional metal strip 109 would be necessary for connecting the two metal strips 107 just as in the embodiment according to FIGS. 1 to 7.

What is claimed is:

1. An electric switch comprising:
   a housing;
   a carrier swivellably mounted in the housing for movement from a central position into first and second opposite directions;
   a first movable contact swivellably mounted at an outer end to a side wall of the housing;
   a first touch slide supported adjacent an inner end of the first movable contact;
   means, mounted in the housing, for biasing the first touch slide toward the carrier such that the first touch slide is displaceable only to one side of the central position of the carrier upon movement of the carrier;
   a first stationary contact mounted in the housing;
   means, responsive to movement of the first touch slide, for snappingly moving the first movable contact in one opposite direction upon movement of the carrier in one direction out of the central position to bring the first movable contact into electrical connection with the first stationary contact;
   a second movable contact swivellably mounted at an outer end to a side wall of the housing;
   a second touch slide supported adjacent an inner end of the second movable contact;
   means, mounted in the housing, for biasing the second touch slide toward the carrier such that the second touch slide is displaceable only to one side of the central position of the carrier upon movement of the carrier;
   a second stationary contact mounted in the housing; and
   means, responsive to movement of the second touch slide, for snappingly moving the second movable contact in one opposite direction upon movement of the carrier in one direction out of the central position to bring the second movable contact into electrical connection with the second stationary contact;
   the second movable contact, the second touch slide and the second stationary contact being arranged symmetrically to the first movable contact, the first touch slide and the first stationary contact, respectively, relative to the central position of the carrier whereby the first and second touch slides are positioned beside each other.

2. An electric switch comprising:
   a housing;
   a carrier swivellably mounted in the housing for movement from a central position into first and second opposite directions;
   a first snap contact bar swivellably mounted at an outer end to a side wall of the housing;
   a catch carried at an inner end of the first snap contact bar;
   a first touch slide supported adjacent the inner end of the first snap contact bar;
   means, mounted in the housing, for biasing the first touch slide toward the carrier such that the first touch slide is displaceable only to one side of the central position of the carrier upon movement of the carrier;
   a catch mounted on the first touch slide and springingly co-operating with the catch on the first snap contact bar;
   a first stationary contact mounted in the housing and engaged by the first snap contact bar when the carrier is swivelled out of the central position in a first direction and the first touch slide is displaced;
   a second snap contact bar swivellably mounted at an outer end to a side wall of the housing;
   a catch carried at an inner end of the second snap contact bar;
   a second touch slide supported adjacent an inner end of the second snap contact bar;
   means, mounted in the housing, for biasing the second touch slide toward the carrier such that the second touch slide is displaceable only to one side of the central position of the carrier upon movement of the carrier;

a catch mounted on the second touch slide and springingly co-operating with the catch on the second snap contact bar;

a second stationary contact mounted in the housing and engaged by the second snap contact bar when the carrier is swivelled out of the central position in a second direction and the second touch slide is displaced; and the second snap contact bar, the second touch slide and the second stationary contact being arranged symmetrically to the first snap contact bar, the first touch slide and the first stationary contact, respectively, relative to the central position of the carrier whereby the first and second touch slides are positioned beside each other.

3. The electric switch according to claim 2 wherein each of the first and second snap contact bars is permanently electrically connected with another stationary contact.

4. The electric switch according to claim 3 wherein each of the first and second snap contact bars is mounted as a cutting edge at its outer end to the another stationary contact associated therewith.

5. The electric switch according to claim 2 wherein each of the first and second touch slides is acted upon by a cam formed on the carrier.

6. The electric switch according to claim 5 wherein the carrier and each of the first and second touch slides have co-operating glide slopes formed thereon.

7. The electric switch according to claim 2 wherein:
when the carrier is in the central position, each of the first and second touch slides is pressed downwardly against the force of the biasing means and, with movement of the carrier out of its central position, only one of the first and second touch slides is cleared from the carrier; and the first and second stationary contacts are positioned on the side of the respective first and second snap contact bars not facing the carrier.

8. The electric switch according to claim 2 wherein:
the inner ends of the first and second snap contact bars face each other; and the first and second touch slides are positioned between the first and second snap contact bars.

9. The electric switch according to claim 2 wherein a third and a fourth stationary contact are mounted relative to the respective first and second snap contact bars and opposite to the first and second stationary contacts which are acted upon by the respective first and second snap contact bars when the carrier is in the central position.

10. The electric switch according to claim 9 further including:
a third and a fourth snap contact bar; and
a third and a fourth touch slide;
the third and fourth snap contact bars and the third and fourth touch slides being arranged in the same relative position with respect to each other and to the central position of the carrier as the first and second snap contact bars and the first and second touch slides, whereby the first, second, third and fourth touch slides are positioned beside each other in the four corners of a rectangle.

11. The electric switch according to claim 10 wherein two of the first, second, third and fourth touch slides located on one side of the central position of the carrier are at least substantially simultaneously displaceable upon actuation of the carrier.

12. The electric switch according to claim 11 wherein the carrier has a first cam formed thereon for displacing a first touch slide and a second cam formed thereon for displacing the second touch slide; and wherein
the ends of the first and second cams are positioned on a line passing through the axis of rotation of the carrier with each of the first and second cams being spaced apart a predetermined distance.

13. The electric switch according to claim 2 wherein the housing includes a recesses for receiving a third and a fourth snap contact bar and a third and a fourth touch slide corresponding to the first and second snap contact bars and the first and second touch slides.

14. The electric switch according to claim 13 wherein when the first and the second snap contact bars and the first and second touch slides are spaced further away from the axis of rotation of the carrier than the recesses formed in the housing.

15. The electric switch according to claim 2 wherein the first touch slide is guided in a base plate formed in the housing and has a shoulder formed on one lateral surface, which shoulder acts on a stop formed on the base plate under the force of a biasing means acting on the first touch slide; and wherein
the housing has an intermediate plate formed therein on which the first touch slide is guided on the side opposite to the shoulder.

16. The electric switch according to claim 2 wherein the housing has a base plate, a top, and an intermediate plate formed between the base plate and the top; and wherein
the intermediate plate in one position of the first and second snap contact bars serves as a stop for the first and second snap contact bars, when one of the first and second stationary contacts is positioned only on one side of the first and second snap contact bars.

17. An electric switch comprising a carrier mounted in a switch housing, the carrier being movable by a switch lever from a central position into opposite directions and swivellable about an axis of rotation fixed to the housing, a first snap contact bar, with an outer end closely disposed adjacent to a side wall of the switch housing and a catch at its inner end, a first touch slide loaded by a spring and arranged before the inner end of the first snap contact bar, which first touch slide is only displaceable with a movement of the carrier to one side of the central position in parallel to the axis of rotation of the carrier and comprises a catch springly co-operating with the catch of the first snap contact bar, a first stationary contact which is acted upon after swivelling the carrier out of its central position in one direction and displacing the first touch slide, and a second snap contact bar, a second touch slide and a second stationary contact which, relative to the central position of the carrier, are arranged symmetrically to the first snap contact bar, first touch slide and first stationary contact, whereby the first and second touch slides are positioned one beside the other.

18. The electric switch according to claim 17 wherein each of the two snap contact bars is permanently connected in an electrically conductive manner with another stationary contact each.

19. The electric switch according to claim 18 wherein the snap contact bar in its outer end is mounted like a cutting edge on the further stationary contact associated with it.

20. The electric switch according to claim 17 wherein each touch slide is acted upon by a cam formed on the carrier.

21. The electric switch according to claim 20 wherein the carrier and each touch slide have co-operating gliding slopes.

22. The electric switch according to claim 17 wherein in the central position of the carrier each touch slide is pressed down against the force of a spring loading it and wherein with a movement of the carrier out of its central position only one touch slide is cleared from the carrier and wherein the first and the second stationary contact are positioned on that side of the respective snap contact bar not facing the carrier.

23. The electric switch according to claim 17 wherein the inner ends of the two snap contact bars are facing each other and wherein the two touch slides are positioned between the two snap contact bars.

24. The electric switch according to claim 17 wherein, relative to the respective snap contact bar opposite to the first and second stationary contact, there is arranged a third and fourth stationary contact, which is acted upon by the respective snap contact bar in the central position of the carrier.

25. The electric switch according to claim 17 wherein a third and a fourth snap contact bar and a third and a fourth touch slide are arranged in the same relative position to each other and to the central position of the carrier as the first and second snap contact bars and the first and the second touch slides, whereby the four touch slides are positioned one beside the other in the four corners of a rectangle.

26. The electric switch according to claim 25 wherein the two touch slides on one side of the central position of the carrier are displaceable upon actuation of the carrier at least substantially simultaneously.

27. The electric switch according to claim 26 wherein the carrier has a first cam for displacing one touch slide and a second cam for displacing the other touch slide and wherein the ends of the first and second cams are positioned on a line passing the axis of rotation of the carrier with a spacing therebetween.

28. The electric switch according to claim 17 wherein the switch housing has recesses for arranging a third and a fourth contact bar and a third and fourth touch slide corresponding to the first and second contact bar and to the first and second touch slide respectively.

29. The electric switch according to claim 28 wherein the first and the second snap contact bars and the first and the second touch slide are farther away, from the axis of rotation of the carrier than the corresponding recesses.

30. The electric switch according to claim 17 wherein the switch housing has a base plate, a top and an intermediate plate between the base plate and the top and wherein the intermediate plate in one position of the snap contact bar serves as a stop for the snap contact bar, when a stationary contact is positioned only on one side of the snap contact bar.

31. The electric switch according to claim 17 wherein the switch housing has a base plate, a top and an intermediate plate between base plate and top and wherein the intermediate plate in one position of the snap contact bar serves as a stop for it, when a stationary contact is positioned only on one side of the snap contact bar.

32. An electric switch comprising:
a housing;
a carrier swivellably mounted in the housing for movement from a central position into first and second opposite directions;
a first snap contact bar swivellably mounted at an outer end to a side wall of the housing;
a catch carried at an inner end of the first snap contact bar;
a first touch slide supported adjacent the inner end of the first snap contact bar;
means, mounted in the housing, for biasing the first touch slide toward the carrier such that the first touch slide is displaceable only to one side of the central position of the carrier upon movement of the carrier;
a catch mounted on the first touch slide and springingly co-operating with the catch on the first snap contact bar;
a first stationary contact mounted in the housing and engaged by the first snap contact bar when the carrier is swivelled out of the central position in a first direction and the first touch slide is displaced;
a second snap contact bar swivellably mounted at an outer end to a side wall of the housing;
a catch carried at an inner end of the second snap contact bar;
a second touch slide supported adjacent an inner end of the second snap contact bar;
means, mounted in the housing, for biasing the second touch slide toward the carrier such that the second touch slide is displaceable only to one side of the central position of the carrier upon movement of the carrier;
a catch mounted on the second touch slide and springingly co-operating with the catch on the second snap contact bar;
a second stationary contact mounted in the housing and engaged by the second snap contact bar when the carrier is swivelled out of the central position in a second direction and the second touch slide is displaced;
the second snap contact bar, the second touch slide and the second stationary contact being arranged symmetrically to the first snap contact bar, the first touch slide and the first stationary contact, respectively, relative to the central position of the carrier whereby the first and second touch slides are positioned beside each other;
each of the first and second snap contact bars being permanently electrically connected with another stationary contact;
each of the first and second touch slides being acted upon by a cam formed on the carrier;
the inner ends of the first and second snap contact bars facing each other;
the first and second touch slides being positioned between the first and second snap contact bars;
a third and a fourth stationary contact mounted relative to the respective first and second snap contact bars and opposite to the first and second stationary contacts which are acted upon by the respective first and second snap contact bars when the carrier is in the central position;
a third and a fourth snap contact bar;
a third and a fourth touch slide;
the third and fourth snap contact bars and the third and fourth touch slides being arranged in the same relative position with respect to each other and to the central position of the carrier as the first and second snap contact bars and the first and second touch slides, whereby the first, second, third and fourth touch slides are positioned beside each other in the four corners of a rectangle;

two of the first, second, third and fourth touch slides located on one side of the central position of the carrier are at least substantially simultaneously displaceable upon actuation of the carrier.

* * * * *